(12) United States Patent
Luo et al.

(10) Patent No.: US 9,325,379 B2
(45) Date of Patent: Apr. 26, 2016

(54) NEAR FIELD COMMUNICATION ELECTRONIC DEVICE AND ANTENNA THEREOF

(75) Inventors: Minli Luo, Guangdong (CN); Lian Zhang, Guangdong (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 392 days.

(21) Appl. No.: 13/811,224

(22) PCT Filed: Oct. 12, 2011

(86) PCT No.: PCT/CN2011/080717
§ 371 (c)(1),
(2), (4) Date: Jan. 18, 2013

(87) PCT Pub. No.: WO2012/088945
PCT Pub. Date: Jul. 5, 2012

(65) Prior Publication Data
US 2013/0130757 A1 May 23, 2013

(30) Foreign Application Priority Data
Dec. 31, 2010 (CN) .......................... 2010 1 0619744

(51) Int. Cl.
| | |
|---|---|
| H04B 5/00 | (2006.01) |
| H01Q 1/24 | (2006.01) |
| H01Q 1/22 | (2006.01) |
| H01Q 7/00 | (2006.01) |
| H04M 1/02 | (2006.01) |
| G06K 7/10 | (2006.01) |

(52) U.S. Cl.
CPC ............... *H04B 5/00* (2013.01); *H01Q 1/2216* (2013.01); *H01Q 1/24* (2013.01); *H01Q 7/00* (2013.01); *G06K 7/10316* (2013.01); *G06K 7/10386* (2013.01); *H04M 1/0262* (2013.01); *H04M 2250/04* (2013.01)

(58) Field of Classification Search
CPC .. H04B 5/00; H04M 1/0262; H04M 2250/04; H01Q 1/2216; H01Q 1/243; H01Q 7/00; H01Q 1/24; G06K 7/10316; G06K 7/10386
USPC ............................................. 455/41.1, 575.7
See application file for complete search history.

(56) References Cited

U.S. PATENT DOCUMENTS

| | | | | |
|---|---|---|---|---|
| 5,619,018 | A * | 4/1997 | Rossi ...................... | H05K 3/308 174/261 |
| 2006/0239236 | A1* | 10/2006 | Otsuka ......................... | 370/338 |
| 2007/0155430 | A1* | 7/2007 | Cheon et al. .................. | 455/558 |
| 2007/0232371 | A1* | 10/2007 | Soekawa et al. ........... | 455/575.5 |
| 2009/0312069 | A1* | 12/2009 | Peng et al. ..................... | 455/572 |
| 2010/0039234 | A1* | 2/2010 | Soliven et al. ............... | 340/10.1 |
| 2010/0093390 | A1 | 4/2010 | Waku et al. | |
| 2011/0115679 | A1* | 5/2011 | Kong et al. ................... | 343/702 |
| 2011/0156959 | A1* | 6/2011 | Chiu ....................... | H01Q 1/38 343/700 MS |

FOREIGN PATENT DOCUMENTS

CN    201585021 U    9/2010

\* cited by examiner

*Primary Examiner* — Raymond Dean
(74) *Attorney, Agent, or Firm* — Shimokaji IP

(57) ABSTRACT

A near field communication electronic device and an antenna may include an antenna module, a near field communication control module and a battery-receiving groove. The antenna module may be electrically connected to the near field communication control module and the antenna module may be disposed around the battery-receiving groove.

20 Claims, 2 Drawing Sheets

NEAR FIELD COMMUNICATION ELECTRONIC DEVICE AND ANTENNA THEREOF

FIELD OF THE INVENTION

The present invention relates to the field of near field communication, and in particular to a near field communication electronic device and antenna.

DESCRIPTION OF THE RELATED ART

Near field communication (NFC) may be developed by integrating non-contact radio frequency identification (RFID) and interconnection technologies, and the RF communication may work at 13.56 MHZ in the communication technologies. One of the NFC technologies may combine a sensing card reader, a sensing card and point to point functions onto a single chip, which can identify compatible apparatuses within a short range and exchange data. The NFC transmission range may be shorter than that of RFID, which could reach several meters or even dozens of meters. Since NFC may adopt unique signal decay technologies, however, it may have features of near distance, high bandwidth and low energy consumption relative to RFID. Therefore, NFC technologies may act in a distance of 10 to 20 cm with a data transmission rate at 106, 212 or 424 kbps, which may be faster, more reliable and simpler than infrared transmission and may be safer than bluetooth.

NFC technologies may be applied more on production, logistics, tracking and asset management, which may mainly include fields of access control, public transportation, cell phone payment, electronic notes, peer communications, mobile information access, reader and writer terminals for non-contact smart cards, and smart cards. Through an internal NFC chip, a cell phone may function as a RFID network module to make payments, or may function as a RFID reader and writer for data exchange and collection. As a result, people can make payments, acquire information and have other services at any location and any time through any apparatuses.

The performance of the NFC antenna in a NFC electronic terminal may determine the NFC range and the performance of the entire NFC electronic terminal. Since the operation frequency band of NFC may be, for example, 13.56 MHZ, NFC antennas may have a large size. Current NFC antennas on cell phones may use a flexible PCB as the antenna body, which may be pasted to the back cover of the cell phone battery and may be connected to the main board by means of a metal spring plate or pins.

First, with such a connection method, the contact may easily get loose after repeated plugging and unplugging of the battery cover, which may affect the performance of the NFC antenna and may further affect the performance of the cell phone.

Since the antenna may be disposed on the back cover of the cell phone, the antenna may function normally only when the back of the cell phone faces other NFC apparatuses due to the shielding effect of the battery, leading to inconvenient operations.

Since the cell phone thickness may be increased by at least 0.5 mm by pasting NFC onto the back cover of the cell phone battery, it may be difficult to make a cell phone thin and light, which may go against the current trend of increasingly thin cell phones.

SUMMARY OF THE INVENTION

A technical problem that the present invention solves is to provide a NFC electronic device with good performance, convenient operations and easy implementation of lightness and thinness.

To solve the above technical problem, the present invention may provide a NFC electronic device, which may include an antenna module, a NFC control module and a battery-receiving groove. The antenna module may be correspondingly electrically connected to the NFC control module, and the antenna module may be disposed around the battery-receiving groove.

According to an exemplary embodiment, the antenna module may comprise a flexible PCB, and the flexible PCB may be disposed around the battery-receiving groove.

According to an exemplary embodiment, the antenna module may include an electrically conductive coating, and the electrically conductive coating may be disposed around the battery-receiving groove.

According to an exemplary embodiment, the NFC electronic device may include a front shell, a rear shell connecting with the front shell and disposed with the battery-receiving groove, and a back shell for covering the battery-receiving groove. The rear shell may be disposed between the front shell and the back shell, and both the side edges of the front shell and the side edges of the rear shell may be disposed around the battery-receiving groove.

According to an exemplary embodiment, the antenna module may be disposed on side edges of the front shell.

According to an exemplary embodiment, the antenna module may be disposed on side edges of the rear shell.

According to an exemplary embodiment, the NFC control module may comprise a NFC processing chip and an antenna matching network circuit. The NFC processing chip may be correspondingly electrically connected to the antenna matching network circuit, and the antenna matching network circuit may be correspondingly electrically connected to the antenna module.

According to an exemplary embodiment, the NFC electronic device may be a cell phone.

According to an exemplary embodiment, the NFC electronic device may be a portable multimedia terminal.

To solve the above technical problem, the present invention may further provide an antenna of the NFC electronic device, and the antenna may include an antenna module. The antenna module may be disposed around a battery-receiving groove of the NFC electronic device.

According to an exemplary embodiment, the antenna module may include a flexible PCB, such that the flexible PCB may be disposed around the battery-receiving groove.

According to an exemplary embodiment, the antenna module may include an electrically conductive coating, such that the electrically conductive coating may be disposed around the battery-receiving groove.

To solve the above technical problem, the present invention may provide a NFC electronic device, which may comprise an antenna module, a NFC control module, a front shell, a rear shell connecting with the front shell and disposed with a battery-receiving groove, and a back shell for covering the battery-receiving groove. The NFC control module may include a NFC processing chip and an antenna matching network circuit. The NFC processing chip may be correspondingly electrically connected to the antenna matching network circuit, and the antenna matching network circuit may be electrically connected to the antenna module. The rear shell may be disposed between the front shell and the back shell. Both the side edges of the front shell and the side edges of the rear shell may be disposed around the battery-receiving groove, and the antenna module may be disposed around the battery-receiving groove.

According to an exemplary embodiment, the antenna module may include a flexible PCB, such that the flexible PCB may be disposed around the battery-receiving groove.

According to an exemplary embodiment, the antenna module may include an electrically conductive coating, such that the electrically conductive coating may be disposed around the battery-receiving groove.

According to an exemplary embodiment, the NFC electronic device may be a cell phone.

According to an exemplary embodiment, the NFC electronic device may be a portable multimedia terminal.

The NFC electronic device may include an antenna module, a NFC control module and a battery-receiving groove. The antenna module may be electrically connected to the NFC control module, and the antenna module may be disposed around the battery-receiving groove. The NFC electronic device of such a design may have the antenna module disposed around the battery-receiving groove. When the NFC electronic device is working, signals of the antenna module may not be shielded by the battery of the NFC electronic device, and the signal transmission performance may be excellent. The device can be used in a plurality of directions, leading to convenient operations. The NFC electronic device according to the present invention may have the advantages of excellent signal transmission performance and convenient operations.

DETAILED DESCRIPTION OF THE PREFERRED EMBODIMENT

The present invention will be described below with reference to the accompanying drawings.

Figure 1:
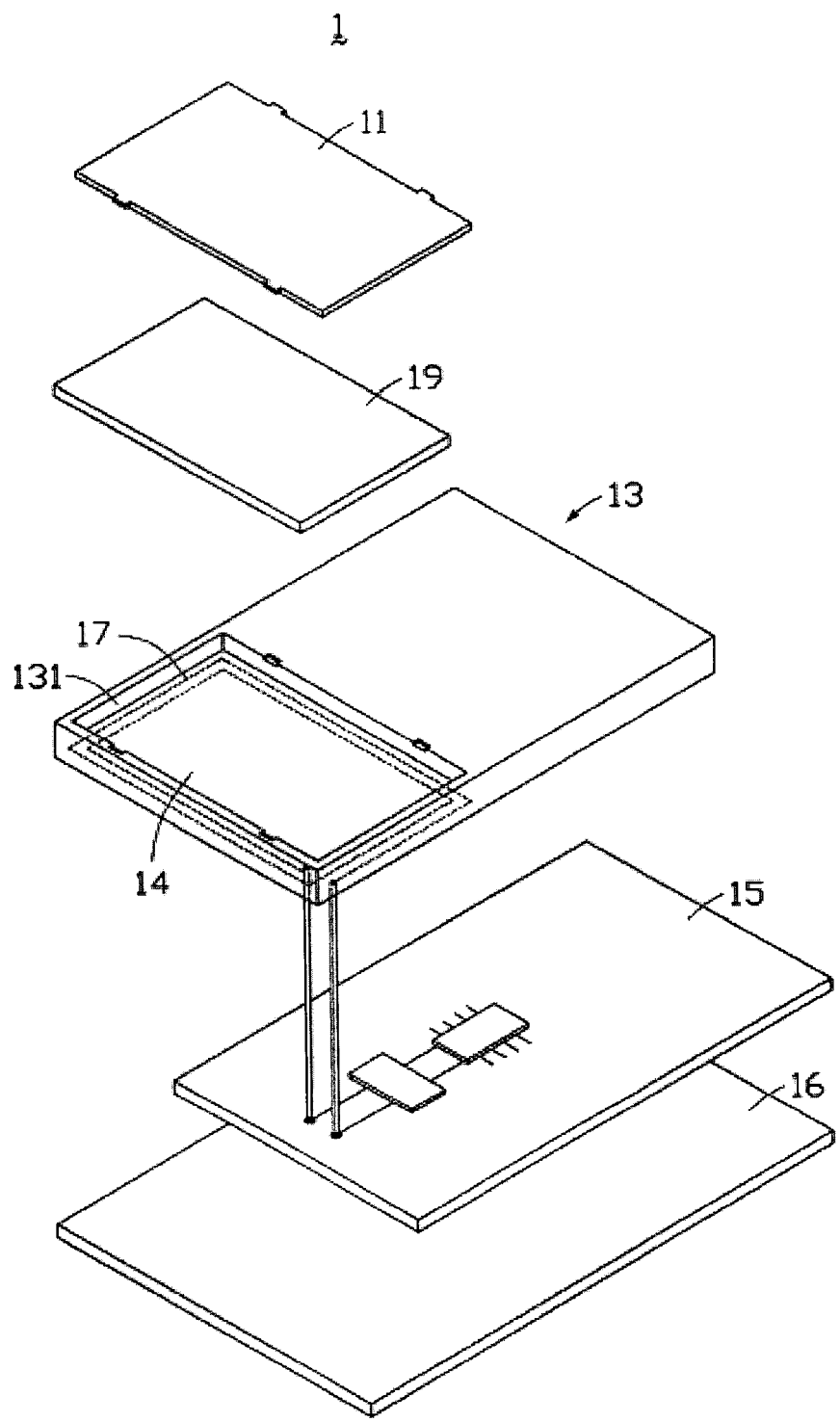
FIG. 1 illustrates the structure of a first embodiment of the NFC electronic device according to the present invention.

FIG. 1 illustrates the structure of the first embodiment of the NFC electronic device according to the present invention.

As seen in FIG. 1, the NFC electronic device 1 comprises an antenna module 17, a NFC control module (not shown) and a battery-receiving groove 14, the antenna module 17 being disposed around the battery-receiving groove 14. Signals of the antenna module 17 of the NFC electronic device 1 of such a design may not be shielded by components in the battery-receiving groove, such as the battery. The signal transmission performance may be excellent, and the device can be used in a plurality of directions, leading to convenient operations.

In another embodiment, the NFC electronic device 1 may include a back shell 11, a rear shell 13, a front shell 16, a circuit board 15 that includes the NFC control module, and a battery 19.

The front shell 16, the rear shell 13 and the back shell 11 may be disposed sequentially from front to back on the NFC electronic device. The circuit board 15 may be disposed between the front shell 16 and the rear shell 13. The side edges of the rear shell 13 (not labeled) may be disposed around the battery-receiving groove 14, and the battery 19 may be received inside the battery-receiving groove 14. The antenna module 17 may be electrically connected to the NFC control module, and the antenna module 17 may be disposed on the side edges of the rear shell 13.

The back shell 11 may be made of plastics, which may be connected to the rear shell 13 by means of for example, locking, or buckling to cover and secure the battery inside the battery-receiving groove 14. The back shell 11 may abut closely against the battery 19 to prevent the battery 19 from shaking and affecting the use of the NFC electronic device 1.

The rear shell 13 may typically be made of plastics or a combination of plastics and metals. The shape of the rear shell 13 may be configured to correspond to the profile of the NFC electronic device 1. In this embodiment, it may be configured to be a substantially rectangular structure corresponding to the profile of the NFC electronic device 1, which may be used to engage with the front shell 16 of the NFC electronic device 1 to secure the circuit board 15 and other components, such as a loudspeaker (not shown) and a microphone (not shown). The rear shell 13 may be disposed between the circuit board 15 and the back shell 11. The battery-receiving groove may be disposed on the side of the rear shell 13 that is away from the circuit board 15. The battery-receiving groove may be configured to correspond to the external profile of the battery 19, and the battery-receiving groove may receive the battery 19. The back shell 11 may be connected to the rear shell 13 by means of, for example, locking, or buckling to cover the battery-receiving groove and secure the battery 19 inside the battery-receiving groove. The side edges of the rear shell 13 may include a side frame 131. The side frame 131 may be disposed around the battery-receiving groove. The side frame 131 may include sidewalls of the battery-receiving groove, or a circular side wall fitted over the outside of the battery-receiving groove. In the present embodiment, the side frame 131 may be configured to be sidewalls of the battery-receiving groove. The antenna module 17 may be disposed on the side frame 131. The antenna module 17 may be electrically connected to the NFC control module.

The front shell 16 may be disposed on the front surface of the NFC electronic device 1. The front shell 16 may engage with the rear shell 13 to secure the circuit board 15. The front shell 16 and the circuit board 15 may be connected by means of a fastening piece (not shown), and the front shell 16 may be disposed with components such as a LCD (not shown) and buttons (not shown).

The circuit board 15 may be made by laying electronic components on a multi-layer or single-layer hard PCB. The circuit board 15 may also be made by laying electronic components on a single-layer or multi-layer flexible PCB. The circuit board 15 may be electrically connected to the antenna module 17. The circuit board 15 may include the NFC control module. The NFC control module may include a NFC processing chip (not shown) and an antenna matching network circuit (not shown). The NFC processing chip may be electrically connected to the antenna matching network circuit, and the antenna matching network circuit may be correspondingly electrically connected to the antenna module 17. The circuit board 15 may further include a power supply port (not shown). The power supply port may be electrically connected to a conductive contact (not shown) inside the battery-receiving groove 14, and the conductive contact may be electrically connected to the battery 19 to supply power from the battery 19 to the NFC electronic device 1.

The antenna module 17 may include a flexible PCB (not shown). The flexible PCB may have a single layer or multiple layers, and the flexible PCB may be made into multiple layers. A way to make the flexible PCB may be that lines of an electrically conductive substance (not labeled) are printed on multiple layers of a flexible material. The lines of the electrically conductive substance may be electrically connected between each layer of the flexible material. The lines of the electrically conductive substance may be made of an electrically conductive material with low electric resistivity, which may be silver, copper, or an alloy thereof. The flexible PCB may be disposed on the sidewall of the side frame 131 of the rear shell 13 by means of pasting or buckling. The flexible PCB may be electrically connected to the NFC control module of the circuit board 15. Specifically, the flexible PCB may be electrically connected to the antenna matching network circuit by means of a spring plate or pins. The antenna module 17 may also be formed by coating an electrically conductive coating on the side frame 131 and the electrically conductive coating may be electrically connected to the antenna matching network circuit.

The signal transmission antenna of the NFC electronic device 1 may be formed by disposing the flexible PCB comprising lines of the electrically conductive substance or the electrically conductive coating on the side frame 131 of the rear shell 13, and the flexible PCB or the electrically conductive coating may be electrically connected to the antenna matching network circuit. Since the antenna module 17 of the NFC electronic device 1 may be disposed on the side frame 131 of the rear shell 13, it may not be shielded by the battery 19 and signals of the antenna module 17 can be transmitted without passing through the battery. As a result, the antenna module 17 may have excellent signal transmission performance and can transmit signals in a plurality of directions, leading to convenient operations. Since the flexible PCB or the electrically conductive coating of the antenna module 17 may be disposed on the side frame 131, the NFC electronic device 1 may easily become light and thin and may perform well.

The NFC electronic device 1 according to the present invention may be a cell phone or a portable multimedia terminal with NFC capabilities.

Therefore, the NFC electronic device 1 according to the present invention may have excellent signal transmission performance, easy implementation of lightness and thinness, convenient use and excellent operational performance.

Figure 2:
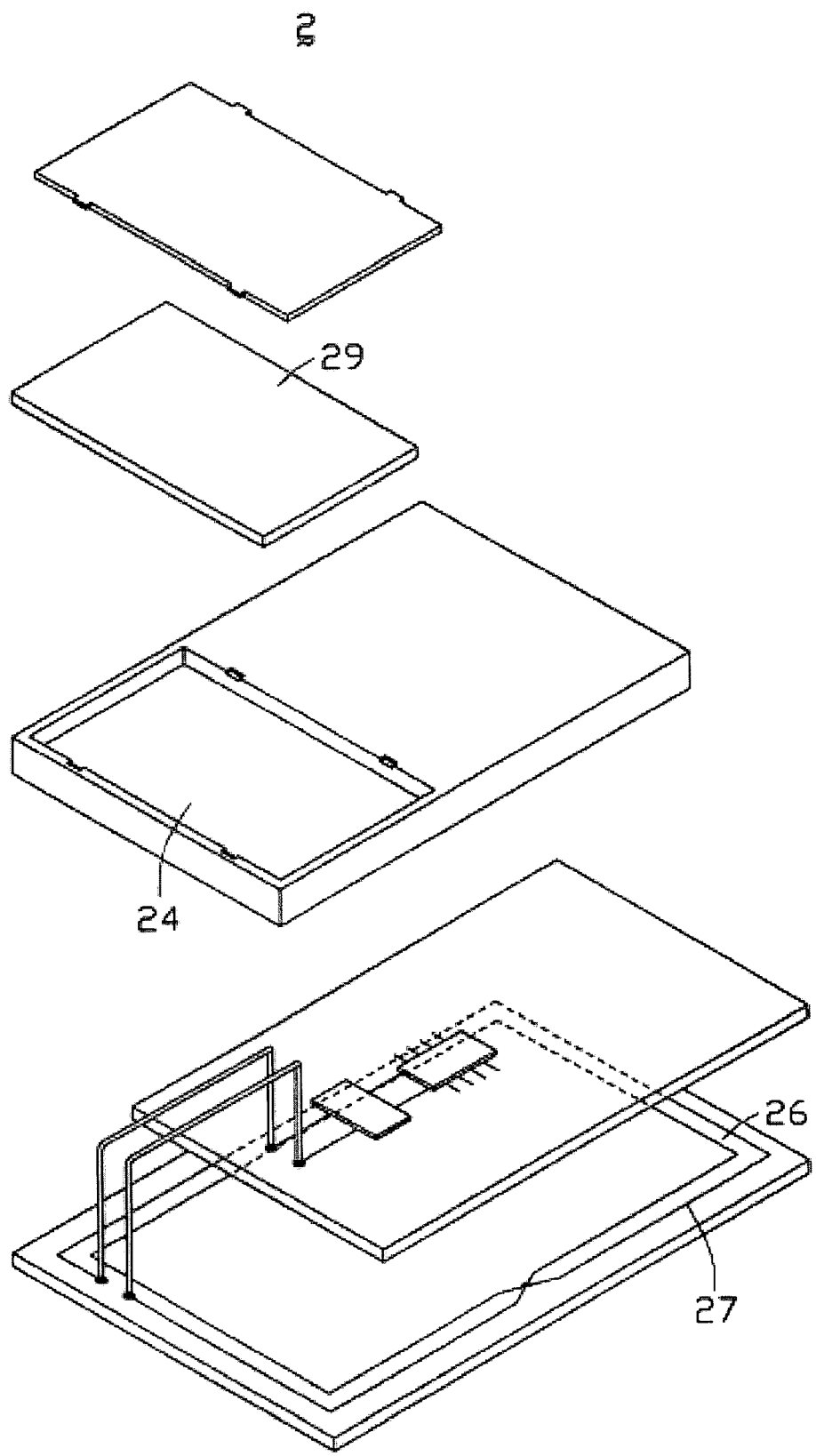
FIG. 2 illustrates the structure of a second embodiment of the NFC electronic device according to the present invention.

FIG. 2 illustrates the structure of the second embodiment of the NFC electronic device according to the present invention. The second embodiment of the NFC electronic device may be substantially the same as the first embodiment. The main difference may be that the antenna module 27 may be disposed on side edges of the front shell 26. The antenna module 27 may include a flexible PCB (not shown). The flexible PCB may be disposed on side edges of the front shell 26, and the flexible PCB may be electrically connected to the antenna matching network circuit (not shown) by means of a spring plate or pins. The antenna module 27 may also be disposed as an electrically conductive coating (not shown), and the electrically conductive coating may be electrically connected to the antenna matching network circuit.

The antenna module 27 may be disposed on side edges of the front shell 26. The side edge may be disposed around the battery-receiving groove 24. The antenna module 27 may not be shielded by the battery 29 and can transmit signals in a plurality of directions, and the signal transmission performance may be excellent. The antenna module 27 may include a flexible PCB or an electrically conductive coating. The antenna module 27 can make the thickness of the NFC electronic device 2 thinner, and the NFC electronic device 2 may easily become light and thin and be convenient to use.

Both NFC electronic devices 1 and 2 according to the present invention may have excellent signal transmission performance, easy implementation of lightness and thinness, convenient use and excellent operational performance.

Only exemplary embodiments of the present invention are described above, and do not restrict the patent scope of the present invention. Any equivalent structural or equivalent process modifications made according to the Description and Drawings of the present invention, as well as direct or indirect applications in other related technical fields, shall be similarly encompassed by the scope of the present invention.

The invention claimed is:

1. A Near Field Communication (NFC) electronic device, comprising:
    an antenna module,
    a NFC control module and
    a battery-receiving groove,
    wherein the antenna module includes a multi-layer printed circuit board, wherein the multi-layer flexible printed circuit board is disposed on a side frame of the battery-receiving groove and is electrically connected to the NFC control module with a spring plate, and
    wherein the antenna module is disposed around the battery-receiving groove such that signals of said antenna module are not shielded by the battery when the battery is inserted into the battery-receiving groove.

2. The NFC electronic device as set forth in claim 1, wherein said antenna module comprises a flexible PCB, said flexible PCB being disposed around the battery-receiving groove.

3. The NFC electronic device as set forth in claim 1, wherein said antenna module comprises an electrically conductive coating, said electrically conductive coating being disposed around the battery-receiving groove.

4. The NFC electronic device as set forth in claim 1, wherein said NFC electronic device comprises a front shell, a rear shell connecting with the front shell and disposed with said battery-receiving groove, and a back shell for covering said battery-receiving groove,
    wherein said rear shell is disposed between said front shell and said back shell, and both the side edges of said front shell and the side edges of said rear shell are disposed around the battery-receiving groove.

5. The NFC electronic device as set forth in claim 4, wherein said antenna module is disposed on the side edges of said front shell.

6. The NFC electronic device as set forth in claim 4, wherein said antenna module is disposed on the side edges of said rear shell.

7. The NFC electronic device as set forth in claim 1, wherein said NFC control module comprises a NFC processing chip and an antenna matching network circuit, such that the NFC processing chip is electrically connected to said antenna matching network circuit, and said antenna matching network circuit is electrically connected to said antenna module.

8. The NFC electronic device as set forth in claim 1, wherein said NFC electronic device is a cell phone.

9. The NFC electronic device as set forth in claim 1, wherein said NFC electronic device is a portable multimedia terminal.

10. An antenna of a Near Field Communication (NFC) electronic device, said antenna comprising an antenna module having an electrically conductive coating, wherein the electrically conductive coating of said antenna module is disposed around a battery-receiving groove within and throughout the depth of the battery-receiving groove of said NFC electronic device such that signals of said antenna module are not shielded by a battery when the battery is positioned within the battery-receiving groove, and wherein the antenna module transmits signals in a plurality of directions surrounding the battery.

11. The antenna as set forth in claim 10, wherein said antenna module comprises a flexible PCB, said flexible PCB being disposed around the battery-receiving groove.

12. The antenna as set forth in claim 10, wherein said antenna module comprises an electrically conductive coating, said electrically conductive coating being disposed around the battery-receiving groove.

13. A Near Field Communication (NFC) electronic device, comprising:
   an antenna module,
   a NFC control module,
   a front shell, wherein the antenna module is disposed on a side edge of the front shell,
   a rear shell connecting with the front shell and disposed with a battery-receiving groove, and
   a back shell for covering said battery-receiving groove,
   wherein said NFC control module comprises a NFC processing chip and an antenna matching network circuit electrically interconnected on a multi-layer printed circuit board using a spring plate,
   wherein said NFC processing chip is electrically connected to said antenna matching network circuit on the multi-layer printed circuit board, and
   wherein said antenna matching network circuit is electrically connected to said antenna module via an electrically conductive coating on the rear shell, and said rear shell is disposed between said front shell and said back shell,
   wherein a plurality of side edges of said front shell and a plurality of side edges of said rear shell are disposed around the battery-receiving groove, and said antenna module is disposed around the battery-receiving groove, wherein the antenna module is disposed within and throughout the depth of the battery-receiving groove.

14. The NFC electronic device as set forth in claim 13, wherein said antenna module comprises a flexible PCB, said flexible PCB being disposed around the battery-receiving groove.

15. The NFC electronic device as set forth in claim 13, wherein said antenna module comprises an electrically conductive coating, said electrically conductive coating being disposed around the battery-receiving groove.

16. The NFC electronic device as set forth in claim 13, wherein said NFC electronic device is a cell phone.

17. The NFC electronic device as set forth in claim 13, wherein said NFC electronic device is a portable multi-media terminal.

18. The NFC electronic device of claim 10, wherein the NFC electronic device is a cell phone.

19. The NFC electronic device of claim 10, wherein the NFC electronic device is a portable multimedia terminal.

20. The NFC electronic device of claim 10, wherein the NFC electronic device comprises:
   a front shell;
   a rear shell connected to the front shell, the rear shell including a battery-receiving groove;
   a back shell disposed to cover the battery-receiving groove, so that the rear shell is disposed between the front shell and the back shell; and
   side edges of both the front shell and the rear shell disposed around the battery-receiving groove.

* * * * *